United States Patent

Morello et al.

[11] Patent Number: 5,966,791
[45] Date of Patent: Oct. 19, 1999

[54] APPARATUS FOR RELEASABLY CONNECTING ROLL FORMERS TO A SEAMING MACHINE

[75] Inventors: Frederick Morello; Matthew J. Yagodich, both of Johnstown; Randall E. Jarratt, Dunlo; Donald W. Bowen, Johnstown, all of Pa.

[73] Assignee: M.I.C. Industries, Inc., Reston, Va.

[21] Appl. No.: 09/086,497

[22] Filed: May 29, 1998

[51] Int. Cl.$^6$ ...................................................... B23P 11/00
[52] U.S. Cl. ............................................................ 29/243.5
[58] Field of Search ..................................... 403/359, 309, 403/310, 195, 344; 279/136; 29/243.5, 243.57, 243.58; 72/51, 52, 210

[56] References Cited

U.S. PATENT DOCUMENTS

| | | | |
|---|---|---|---|
| 2,386,473 | 10/1945 | Kanary | 403/309 |
| 3,487,799 | 1/1970 | Grönlund . | |
| 3,528,167 | 9/1970 | Lipp . | |
| 3,797,430 | 3/1974 | Boudreau . | |
| 3,875,642 | 4/1975 | Knudson . | |
| 3,902,288 | 9/1975 | Knudson . | |
| 3,967,430 | 7/1976 | Knudson . | |
| 4,027,611 | 6/1977 | Ward et al. . | |
| 4,301,587 | 11/1981 | Boyd . | |
| 4,392,759 | 7/1983 | Cook | 403/359 |
| 4,470,186 | 9/1984 | Knudson . | |
| 4,505,084 | 3/1985 | Knudson . | |
| 4,726,107 | 2/1988 | Knudson . | |
| 4,918,797 | 4/1990 | Watkins et al. . | |
| 4,989,308 | 2/1991 | Sanders . | |
| 5,249,445 | 10/1993 | Morello . | |
| 5,577,859 | 11/1996 | Nau | 403/359 |
| 5,604,966 | 2/1997 | Morello et al. . | |
| 5,623,805 | 4/1997 | Morello . | |
| 5,628,578 | 5/1997 | McClanahan et al. | 403/359 |

*Primary Examiner*—Robert C. Watson
*Attorney, Agent, or Firm*—Rothwell, Figg, Ernst & Kurz, P.C.

[57] ABSTRACT

A sealing apparatus for connecting two adjacent panels includes a releasable connection for quickly releasing forming rollers of the sealing apparatus. The apparatus includes drive shafts for driving the seaming rollers. At least one of the drive shafts has a spline portion and an engagement portion proximate a distal end thereof. A hub member has a complimentary spline portion engagable with the spline portion of the drive shaft, with a seaming roller fixedly connected to the hub member. And, a spring biased hub clip has an engagement portion that is releasably engagable with the engagement portion of the drive shaft to releasably hold the drive shaft to the hub member.

12 Claims, 1 Drawing Sheet

APPARATUS FOR RELEASABLY CONNECTING ROLL FORMERS TO A SEAMING MACHINE

BACKGROUND OF THE INVENTION

1. Field of the Invention

This invention relates generally to the attachment of forming rolls and the like to seaming machines, for seaming metal panels, and the like. The invention is particularly applicable to seaming machines and is particularly useful for the attachment of metal forming rolls to shafts of a seaming machine.

2. Background and Prior Art

Various types of connectors are known in the art for attaching roll formers to seaming machines. These known connectors, however, have a number of deficiencies and specific features that make them undesirable in certain situations.

In known seaming machines, two corrugated panels are typically seamed together with roll formers that are passed along a seam for seaming. After the seamer completes one pass across a seam from a first side to a second side of the panel, the user has one of two options. First, the seamer can be carried back to the first side proximate the beginning of the previous seam and a second seam can be started; or second, the roll former can be switched on the seaming machine and the new seam can be seamed in the opposite direction from the previous seam, i.e., starting from the second side of the panels. When the seamer operator reaches the end of the second seam, the rolls can then be switched again, preparing the seamer for another pass.

Although switching the seamer rolls takes some time, switching the seamer rolls can still save time, and thus be advantageous, by allowing the operator to seam in both directions of the building. Otherwise, the operator has to carry the seamer to the opposite side of the building to continue seaming. The problem with the latter option is that the operator must physically carry the seamer back to the other side of the building. This reduces efficiency, wastes time and unduly burdens the operator.

SUMMARY OF THE INVENTION

The present invention provides a quick release connection for a seaming machine, and in particular a quick release hub for a seaming machine.

Although the present invention can be applied in any known seaming machine, it is preferably applied within a seaming machine like that shown in U.S. Pat. No. 4,470,186 (assigned to MIC Industries, Inc., of Reston, Va.), the entire disclosure of which is incorporated herein by reference. Other exemplary seaming machines in which the present invention can be applied are shown in U.S. Pat. Nos. 3,875,642, 5,623,805, and 5,604,966, the entire disclosures of which are also incorporated herein by reference.

According to one aspect of the invention, at least one roll of a seamer machine is provided with a quick release connection according to the present invention.

The quick release connection preferably includes a splined hub which mates with a splined shaft. The hub bolts preferably into the roll using corrosion resistant hex style screws. Preferably, the splined hub includes at least one quick release clip that is bolted directly to the splined hub. The quick release clip(s) preferably act under spring tension to securely hold the clip(s) to the splined shaft. The clips can thus secure the roll to the shaft and prevent the roll from axially moving along the shaft.

During the seaming process, a large axial force is applied. Accordingly, the clips are preferably designed to prevent any yielding from occurring during such excessive forces generated by the roll forming process.

All components exposed to the outside elements are preferably corrosion resistant. For example, the spline and hub material are preferably a standard SAE Type "C" code material. In addition, for ease of use, the clips preferably have an ergonomic design that compliments the overall design.

The present invention can thus provide a secure connection, while at the same time, providing a quick disconnect of the rolls to allow rolls to be easily removed and/or replaced as needed—such as, for example, to remove and reverse rollers in order to seam in two directions.

The above and other advantages, features and aspects of the present invention will be more readily perceived from the following description of the preferred embodiments taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED EMBODIMENT OF PREFERRED EMBODIMENT

Figure 1:
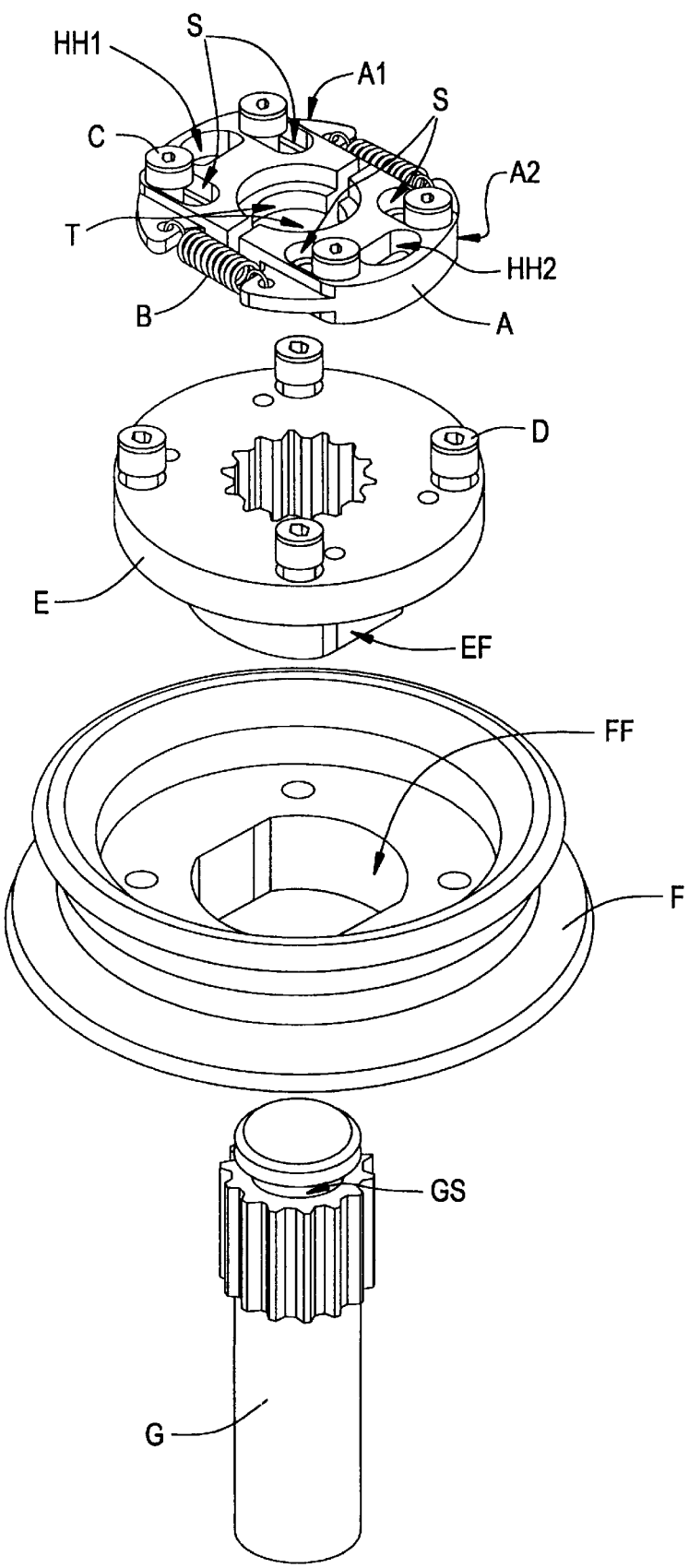
FIG. 1 is an isometric exploded view depicting the entire assembly and each part individually, illustrating how the parts are positioned and assembled in the assembly.

In the preferred embodiment as shown in FIG. 1, a quick change hub E is attached to a seamer roll F with an attachment means. Preferably, the attachment means includes bolts or screws D for bolting the hub E to the seamer roll F. The bolts are preferably ¼"–20 socket head cap screws.

The quick change hub preferably includes a fitting adapter EF (e.g., a protrusion extending from a lower side thereof) that mates with a fitting adapter FF (e.g., a receiving hole) machined into the seamer roll. The fitting adapters EF, FF are preferably designed to absorb the torque produced by the rotational translation of the assembly during operation. The design should not allow a stress level to exceed the allowable design stress as defined by standard machine design practices. The screws D are preferably coated with zinc, chrome, or possess some other type of plating or means to resist corrosion. The quick change hub E preferably includes a spline in the center thereof. The spline is preferably a standard 14 tooth spline. The material of the splined hub is preferably an SAE Type "C". The material of the hub E and the quick change shaft G is preferably manufactured from a material which will be consistent and provide a suitable mating interface between the shaft G and the hub E. For example, there should be no deterioration between the shaft G and the hub E during the operation of the machine due to material or hardness discrepancies.

A quick change hub clip A is preferably attached to the hub E with attachment means, preferably via screws or bolts C. The bolts C are preferably ¼" 10–24 stainless steel shoulder screws.

Preferably, the hub clip A includes two quick change hub clips A1 and A2. Preferably, the hub clips undergo a corrosion resistant process to limit the amount of corrosion due to exposure to the elements. The hub clips A1 and A2 are preferably held together under a linear force through the use of a spring biasing means, such as at least one metal spring. The spring biasing means pulls the hub clips towards one another. Preferably, the spring biasing means includes at least one coil spring. In one the preferred illustrated embodiment, two 0.025 wire gauge close wound extension springs B are used.

The spring(s) are preferably configured to have a spring force that does not exceed the forces required to physically pull the clips away from the shaft for quick release. The spring force is, however, preferably strong enough to adequately hold the roll assembly onto the shaft. The spring (s) can be, for example, within an elastic range and subject to and obeying Hooker's Law. The spring(s) are preferably manufactured from a corrosion resistant material so as to inhibit the initialization of oxidation.

After the quick change hub clips A1 and A2 are bolted onto the hub, slots S which are pre-cut into the clips can allow the clips to slide back and forth with the screws C acting as guides for the clips (as well as functioning as fastening means). The screws C preferably do not protrude beyond the perimeter edges of the quick change hub clips A1 and A2.

The quick change hub E is also preferably counter-bored to accept the socket head cap screws D. The tops of the socket head cap screws D are preferably flush with or beneath the top surface of the quick change hub E, and preferably do not protrude from the hub.

After the quick change hub E is assembled to the seamer roll F and the hub clip A is assembled to the hub E, the operation of the connection is preferably performed as follows. An operator pulls back on the quick change hub clips A1 and A2 by utilizing his/her thumb or hand pressure within hand-holes HH1 and/or HH2 on the respective clips. In this manner, the clips can be separated against the bias of the springs B so as to allow the shaft G to slide into the roll assembly.

Once the roll assembly is fit onto the shaft, the operator can release clips A1 and A2 so that the springs B can force the clips to mate with the shaft. In this regard, the clips A1 and A2 are preferably formed with tongues T on their interior edges that can mate with an annular slot GS proximate an end of the the shaft G. This can ensure a secure fit of the clips onto the shaft G. To release the roll F from the shaft G, the operator can manually pull the clips apart and the roll F can then be quickly and easily pulled off of the shaft.

While the present invention has been shown and described with reference to preferred embodiments presently contemplated as best modes for carrying out the invention, various changes may be made in adapting the invention to different embodiments without departing from the broader inventive concepts disclosed herein and comprehended by the claims which follow.

What is claimed is:

1. A sealing apparatus for connecting two adjacent panels, comprising:
    a drive means for rotating a plurality of seaming rollers, said drive means including a first drive shaft for driving one of said seaming rollers;
    said drive shaft having a spline portion and an engagement portion proximate a distal end thereof;
    a hub member having a complimentary spline portion engagable with said spline portion of said drive shaft, said one of said seaming rollers being fixedly connected to said hub member; and
    at least one spring biased hub clip having an engagement portion that is releasably engagable with said engagement portion of said drive shaft to releasably hold said drive shaft to said hub member.

2. The sealing apparatus of claim 1, wherein said hub member is fixedly connected to said one of said seaming rollers with one or more bolts.

3. The sealing apparatus of claim 1, wherein each said at least one spring biased hub clip is fixed to said hub member.

4. The sealing apparatus of claim 3, wherein each said at least one spring biased hub clip is fixed to said hub member with one or more bolts.

5. The sealing apparatus of claim 4, wherein each said at least one spring biased hub clip has at least one slot for receiving said bolts, whereby each said at least one spring biased hub clip is laterally movably about said bolts with said bolts serving as guides for each said at least one hub clip.

6. The sealing apparatus of claim 5, further including at least one spring that biases said at least one hub clip in a lateral direction.

7. The sealing apparatus of claim 6, wherein said lateral direction is towards a center axis of said drive shaft.

8. The sealing apparatus of claim 7, wherein said engagement portion of said drive shaft includes a slot that extends around at least a portion of a circumference of said shaft, and said engagement portion of each said at least one spring biased hub clip includes a tongue that is engagable with said slot, said at least one spring biasing said tongue into said slot.

9. The sealing apparatus of claim 6, wherein said at least one spring includes at least one coil spring.

10. The sealing apparatus of claim 5, wherein each said at least one spring biased hub clip includes a hand hold portion that a user can grasp to move said spring biased hub clip against said spring force.

11. The sealing apparatus of claim 10, wherein said at least one spring biased hub clip includes two spring biased hub clips that are biased towards one another.

12. The sealing apparatus of claim 1, wherein said at least one spring biased hub clip includes two spring biased hub clips that are biased towards one another.

\* \* \* \* \*